Patented Aug. 7, 1951

2,562,980

UNITED STATES PATENT OFFICE 2,562,980

PROCESS FOR UPGRADING DIESEL FUEL

Harold V. Atwell, Beacon, N. Y., assignor to The Texas Company, New York, N. Y., a corporation of Delaware No Drawing. Application June 5, 1948,
Serial No. 31,389

7 Claims. (Cl. 260—450)

This invention relates to the upgrading of Diesel oil and more particularly to improving the quality of Diesel oil containing a substantial quantity of olefinic material.

The presence of olefins adversely affects the quality of Diesel oil; the cetane rating is substantially lowered if a Diesel oil fraction contains an appreciable olein content. The usual method for improving the quality of a low grade olefinic Diesel fraction is by hydrogenation of the olefins to paraffinic stock.

The novel procedure of this invention involves contacting olefin-containing Diesel oil with a mixture of carbon monoxide and hydrogen at elevated temperature and pressure in the presence of a catalyst whereby olefinic constituents are converted to oxygen-containing compounds. The oxygen-containing compounds are thereafter separated from the Diesel fraction by conventional procedures such as solvent extraction, extractive distillation or adsorption on a surface-active material. The removal of the oxygen-containing compounds formed by treatment of the Diesel oil with carbon monoxide and hydrogen produces a Diesel oil of high quality. Advantageously, the product mixture obtained by reaction of the Diesel fraction with a mixture of carbon monoxide and hydrogen is hydrogenated prior to the removal of the oxygen-containing compounds from the Diesel fraction. Hydrogenation of the Diesel fraction after the reaction of the Diesel fraction with carbon monoxide and hydrogen converts the oxygen-containing compounds to high molecular weight alcohols which are commercially valuable compounds.

The reaction between the olefinic Diesel fraction and the mixture of carbon monoxide and hydrogen results in the conversion of olefinic constituents of the Diesel fraction to a mixture of carbonylic oxygen-containing organic compounds comprising mainly aldehydes and minor portions of ketones. Hydrogenation of the carbonylic product mixture obtained by the reaction of the Diesel fraction with carbon monoxide and hydrogen in accordance with the preferred mode of operation converts aldehydes and ketones to alcohols. The alcohols thereby formed are more stable than the aldehydes and ketones produced by the reaction of the olefinic Diesel fraction with carbon monoxide and hydrogen and as a consequence, the removal of the oxygen-containing compounds from the Diesel fraction is facilitated by hydrogenating the product mixture obtained by the reaction of the Diesel fraction with carbon monoxide and hydrogen. Moreover, the alcohols obtained by the hydrogenation of the product obtained from the reaction of the Diesel fraction with CO—$H_2$ mixture contain about 10–20 carbon atoms per molecule and are in commercial demand as intermediates in the synthesis of plasticizers, detergents and lubricating oils additives.

The outstanding advantage of the method of this invention for upgrading Diesel fuel resides in the fact that not only is the cetane rating of the olefinic Diesel fraction substantially improved, but also there are obtained as by-products of the upgrading process oxygen-containing organic compounds containing from about 10 to 20 carbon atoms which are valuable chemical intermediates for which there is a huge commercial demand. Aldehydes, ketones and particularly alcohols which contain about 10 to 20 carbon atoms per molecule comprise a group of chemicals for which there is a multitude of existing and potential uses. The method of this invention not only provides a source of such compounds but simultaneously substantially improves the quality of an olefinic Diesel fraction.

The reaction between the olefin-containing Diesel oil fraction and a mixture of carbon monoxide and hydrogen is effected in the presence of a catalyst of the iron group at a temperature between about 100 and 400° F. and at a pressure of about 100 to 5,000 pounds per square inch. Temperatures between about 125 and 350° F. and pressures of about 300 to 3,000 pounds per square inch are preferred.

A cobalt catalyst is advantageously employed to effect the reaction between the olefinic constituents of the Diesel oil fraction and the carbon monoxide-hydrogen mixture. A supported cobalt catalyst in which the active cobalt constituent is supported on a surface-active material such as uncalcined diatomaceous earth, alumina, silica, silica-stabilized alumina, etc., and which is promoted with minor quantities of oxides of metals such as magnesium, thorium, vanadium, titanium, calcium, manganese, etc., has been found to be highly active in effecting reaction between the carbon monoxide-hydrogen mixture and olefins of a Diesel oil fraction. Unsupported but promoted cobalt catalysts such as a cobalt-magnesia-thoria catalyst is also active for this reaction. When a cobalt catalyst is employed, the reaction between the olefins of the Diesel oil fraction and a carbon monoxide-hydrogen mixture is advantageously effected at a temperature between about 125 and 350° F. and at a pressure between 300 and 3,000 pounds per square inch.

In effecting reaction between the olefinic constituents of the Diesel oil fraction and CO+$H_2$, it is advisable to employ a molar quantity of carbon monoxide that is at least equivalent to the molar concentration of olefins in the Diesel oil fraction. The hydrogen content of the CO-hydrogen mixture is advantageously at least the molar equivalent to the carbon monoxide content of the CO—$H_2$ mixture. The conventional 2 to 1$H_2$—CO mixture employed for the production of synthetic fuels forms a satisfactory reactant mixture but a 1 to 1 mixture is preferred.

In practice, the olefin content of the Diesel oil fraction is determined by conventional means such as bromine number; thereafter the Diesel fraction is reacted with enough 1 to 1$H_2$—CO mixture so that the carbon monoxide reactant is at least the molar equivalent of the olefinic content of the Diesel oil. The reaction of olefinic Diesel oil with an excess of carbon monoxide-hydrogen mixture is a practical mode of operation since the unreacted carbon monoxide and hydrogen are readily isolated from the liquid product and recycled to the reaction zone.

The reaction between the olefinic Diesel fraction, CO and $H_2$ can be effected by means of any of the conventional procedures of conversion. A fixed bed type of operation wherein the olefinic Diesel fraction and the gaseous carbon monoxide-hydrogen mixture are passed over a fixed bed of catalyst may be employed in either of two modifications; the Diesel fraction and the CO—$H_2$ mixture can be passed over the catalyst either currently or countercurrently. It is also possible to contact CO and $H_2$ with an olefinic Diesel fraction in the presence of a stirred catalyst. Batch type slurry and continuous slurry operations are also feasible means of effecting reaction between the olefinic Diesel oil and the CO+$H_2$ mixture.

The carbonylic oxygen-containing hydrocarbons formed by the reaction of CO—$H_2$ mixture with olefinic Diesel oil and the alcohols produced by the hydrogenation thereof are preferably separated from the Diesel oil fraction by use of an absorbent material such as silica gel. The carbonylic product obtained by reaction of olefinic Diesel oil with a CO—$H_2$ mixture or the alcohols obtained by the hydrogenation of this carbonylic product are contacted with silica gel whereby oxygen-containing organic compounds are substantially adsorbed by the silica gel. The Diesel fraction is substantially freed from oxygen-containing compounds by this treatment and the oxygen-containing hydrocarbons can be recovered from the silica gel by elution with a strongly adsorbed solvent such as acetone.

Solvent extraction and extractive distillation may also be used to separate the oxygen-containing compounds from Diesel fraction. The solvent employed for solvent extraction should be Diesel oil-immiscible and have a substantial solvent effect upon oxygen-containing compounds having from 10 to 20 carbon atoms; aqueous methanol may be employed.

If the carbonylic product is converted to alcohols, sulfating agents such as sulfur trioxide and sulfuric acid may be used to separate oxygen-containing compounds from the Diesel fraction. Sulfuric acid reacts with alcohols to produce alkyl acid sulfates which can be separated from the Diesel fraction.

The hydrogenation of the product obtained by the reaction of an olefinic Diesel fraction with a CO—$H_2$ mixture can be effected either with a conventional hydrogenation catalyst such as copper chromite or with the same catalyst as is employed for the reaction between the olefinic Diesel fraction and the carbon monoxide-hydrogen mixture. If a cobalt catalyst is used for the reaction of both the olefinic Diesel fraction and the CO—$H_2$ mixture and for the hydrogenation step, it is necessary to employ a hydrogen stream substantially free from carbon monoxide because a cobalt catalyst is readily poisoned, as far as its effectiveness for hydrogenation is concerned, by the presence of carbon monoxide. Conventional hydrogenation catalysts such as zinc chromite, copper chromite, cobalt chromite are less sensitive to carbon monoxide.

The hydrogenation step is ordinarily performed under approximately the same conditions of pressure as is the reaction between the olefinic Diesel fraction and the CO+$H_2$ mixture; that is, pressures between 100 and 5,000 pounds per square inch can be employed for the hydrogenation. In operation, it is generally preferred to use a pressure approximately the equivalent of that employed for the reaction between the Diesel fraction and the CO—$H_2$ mixture. It is possible to use temperatures equivalent to that employed for the reaction between the Diesel fraction and the CO+$H_2$ mixture for the hydrogenation, but it is ordinarily advisable to employ somewhat higher temperatures, for example, in the range of 300 to 900° F.

The Diesel oil fraction obtained by the catalytic conversion of carbon monoxide and hydrogen to liquid hydrocarbons employing an iron catalyst in a fluid type process at a temperature between 550 and 700° F. and at a pressure between 200 and 500 pounds per square inch contains a substantial percentage of olefins and has, as a consequence, a poor quality having a cetane number in the range of about 40 to 50. This Diesel fraction also contains a minor quantity, approximately 5 per cent, of oxygen-containing compounds comprising high boiling alcohols, esters and acids. The process of this invention provides an excellent method of improving the quality of this synthetic Diesel oil and simultaneously provides a source of high boiling alcohols which are in demand as building blocks for synthetic detergents, plasticizers and lubricating oil additives.

A typical Diesel fraction, distilling between 420 and 600° F. from a synthesis operation wherein a mixture of carbon monoxide and hydrogen was converted to liquid hydrocarbons employing an iron catalyst in a fluid technique at a temperature between 550 and 750° F. and at a pressure of 150 to 450 pounds per square inch, had a cetane number of 48 after it had been treated with sodium bisulfite for removal of aldehydes, extracted with ethylene glycol and distilled. A portion of this Diesel fraction, after hydrogenation at 2500 pounds per square inch and at 350° F. over reduced nickel, had a cetane number of 58.3.

When another portion of this Diesel fraction was treated in accordance with the method of this invention, a Diesel oil fraction was obtained having a cetane number of 65.4. The following procedure was followed for the upgrading of the Diesel fraction; the Diesel fraction of cetane number 48 was reacted with an equimolecular CO—$H_2$ mixture at a temperature of 150° F. at a pressure of about 700 pounds per square inch in a fixed bed of a supported cobalt catalyst comprising approximately 32 per cent cobalt, 64 per cent uncalcined diatomaceous earth, 3 per cent magnesia and 1 per cent thoria; the entire product thereby obtained was hydrogenated at 3000 pounds per square inch and at 350° F. using a reduced nickel catalyst; the hydrogenated liquid was percolated through silica gel whereby oxygen-containing compounds were separated from the Diesel oil by adsorption on silica gel and there was obtained a silica gel percolate comprising a Diesel fraction substantially free from both olefins and oxygen-containing compounds; the silica gel was washed with pentane and the pentane wash combined with the silica gel percolate; the combined silica gel percolate and pentane wash were depentanized to yield a Diesel oil fraction having a cetane number of 65.4.

The oxygen-containing compounds comprising mainly alcohols formed by the hydrogenation of the carbonylic compounds formed by the reaction between olefins and the CO—$H_2$ mixture were desorbed from the silica gel with acetone and were recovered from the acetone eluate by stripping the acetone therefrom. Analysis of the oxygen-containing compounds showed them to be approximately 84 per cent primary alcohols containing about 10 to 20 carbon atoms per molecule. The oxygen-containing compounds were further characterized by a hydroxyl number of 151–158, a neutralization number of about 1.90 and a saponification number of about 36.2.

The efficiency of the method of the present invention for upgrading Diesel fuel is established by the more than 17 point increase in the cetane value of the Diesel fuel. The method of the invention provides an excellent method for improving the quality of a highly olefinic Diesel fuel such as is obtained by the catalytic conversion of synthesis gas to liquid hydrocarbons.

The oxygen-containing materials produced during the upgrading of the Diesel oil can be fractionated into individual components or may be used directly in the production of synthetic detergents or in preparation of plasticizers.

It is to be understood that the invention is not limited to conditions used in the example; other temperatures, pressures within the prescribed limits and catalysts of the type described may be employed for the reaction of Diesel oil with a CO—$H_2$ mixture and in similar fashion, other conditions may be employed to hydrogenate the carbonylic compounds produced by the reaction of the Diesel oil with a CO—$H_2$ mixture. Moreover, the oxygen-containing compounds produced may be separated from the product by solvent extraction and reaction with sulfuric acid.

Moreover, it is also feasible to employ tail gas from the synthesis operation, wherein liquid hydrocarbons are produced by catalytic conversion of CO and $H_2$, to hydrogenate the varbonylic product to alcohols. Since this tail gas contains carbon monoxide, it will be necessary to use catalysts such as zinc chromite, copper chromite to effect the hydrogenation with tail gas.

Obviously many modifications and variations of the invention, as hereinbefore set forth, may be made without departing from the spirit and scope thereof and, therefore, only such limitations should be imposed as are indicated in the appended claims.

I claim:

1. A process for upgrading olefin-containing Diesel oil obtained by the catalytic conversion of carbon monoxide and hydrogen which comprises reacting synthesis gas in the presence of an iron catalyst at an elevated temperature of 550 to 700° F. and at a pressure of from 200 to 500 pounds per square inch to form a product rich in olefins, separating a hydrogen-rich tail gas and an olefin-containing Diesel oil fraction from said product, contacting said Diesel oil fraction with carbon monoxide and hydrogen at a temperature between 100 and 350° F. and at a pressure between about 100 to 5000 pounds per square inch in the presence of a catalyst containing a metal of the iron group, converting olefinic constituents of said Diesel fraction to oxygen-containing compounds, hydrogenating said oxygen-containing compounds with said tail gas separated from said product and removing oxygen-containing compounds from said hydrogenated Diesel oil fraction.

2. A process according to claim 1 in which a copper chromite is employed for the hydrogenation of the Diesel fraction with tail gas.

3. A process according to claim 1 in which a cobalt catalyst is employed for the reaction of the Diesel oil fraction with carbon monoxide and hydrogen.

4. A process according to claim 1 in which oxygen-containing compounds are separated from the hydrogenated Diesel oil fraction by use of a surface-active absorbent.

5. A process according to claim 1 in which silica gel is employed to separate oxygen-containing compounds from the hydrogenated Diesel oil fraction.

6. A process according to claim 1 in which oxygen-containing compounds are separated from the hydrogenated Diesel oil fraction by solvent extraction with a Diesel oil immiscible solvent.

7. A process according to claim 1 in which oxygen-containing compounds are separated from said hydrogenated Diesel oil fraction by contacting said Diesel fraction with a sulfating agent.

HAROLD V. ATWELL.

REFERENCES CITED

The following references are of record in the file of this patent:

UNITED STATES PATENTS

| Number | Name | Date |
| --- | --- | --- |
| 2,327,066 | Roelen | Aug. 17, 1943 |
| 2,415,102 | Landgraf et al. | Feb. 4, 1947 |
| 2,457,257 | Michael et al. | Dec. 28, 1948 |
| 2,494,371 | Wadley | Jan. 10, 1950 |

FOREIGN PATENTS

| Number | Country | Date |
| --- | --- | --- |
| 111,374 | Australia | Aug. 23, 1940 |

OTHER REFERENCES

A. P. C. pub. Serial No. 373,703, July 13, 1943.

Report on the Petroleum and Synthetic Oil Industry of Germany; B. I. O. S. Overall Report No. 1, pub. by His Majesty's Stationery Office, London (1947), pages 101–102.

Nat. Pet. News, vol. 37, No. 45, sec. 2, November 7, 1945, pages R926 and R928.

U. S. Naval Tech. Mission (1945), pages 72, 77 and 88 to 91.

Fiat Final Report No. 1000 (PB 81, 383), page 38, December 26, 1947.